United States Patent
Markley et al.

(10) Patent No.: US 7,597,640 B2
(45) Date of Patent: Oct. 6, 2009

(54) LONG MECHANICAL TENSIONER WITH A COMPLIANT BLADE SPRING

(75) Inventors: George L. Markley, Montour Falls, NY (US); James Capp, Endwell, NY (US); Mark M. Wigsten, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 610 days.

(21) Appl. No.: 11/204,306

(22) Filed: Aug. 15, 2005

(65) Prior Publication Data

US 2007/0037647 A1 Feb. 15, 2007

(51) Int. Cl.
*F16H 7/08* (2006.01)
*F16H 7/18* (2006.01)

(52) U.S. Cl. .................. 474/111; 474/109

(58) Field of Classification Search ............ 474/101, 474/109, 111, 133–138, 140
See application file for complete search history.

(56) References Cited

U.S. PATENT DOCUMENTS

| | | | | |
|---|---|---|---|---|
| 4,395,251 A | | 7/1983 | King et al. ............... 474/111 |
| 5,266,066 A | * | 11/1993 | White ..................... 474/111 |
| 5,797,818 A | | 8/1998 | Young .................... 474/111 |
| 5,967,921 A | | 10/1999 | Simpson et al. .......... 474/110 |
| 5,984,815 A | * | 11/1999 | Baddaria ................. 474/111 |
| 6,155,941 A | | 12/2000 | White et al. ............. 474/110 |
| 6,364,796 B1 | * | 4/2002 | Nakamura et al. ........ 474/111 |
| 6,375,587 B1 | | 4/2002 | Wigsten .................. 474/111 |
| 6,478,703 B2 | | 11/2002 | Suzuki .................... 474/101 |
| 6,599,209 B1 | | 7/2003 | Ullein et al. ............. 474/111 |
| 6,609,986 B1 | | 8/2003 | Wigsten |
| 6,623,391 B2 | | 9/2003 | Young et al. ............. 474/111 |
| 6,939,259 B2 | * | 9/2005 | Thomas et al. ........... 474/111 |
| 6,955,621 B2 | * | 10/2005 | Wigsten et al. .......... 474/110 |
| 7,014,585 B2 | * | 3/2006 | Horikawa et al. ........ 474/111 |
| 2002/0198073 A1 | * | 12/2002 | Takeda et al. ........... 474/111 |
| 2005/0085322 A1 | * | 4/2005 | Markley .................. 474/109 |

FOREIGN PATENT DOCUMENTS

| | | |
|---|---|---|
| EP | 1070875 | 1/2001 |
| EP | 1164312 | 12/2001 |
| EP | 1526306 | 4/2005 |
| FR | 827707 | 5/1938 |
| GB | 505746 | 5/1939 |
| GB | 1290279 | 9/1972 |
| GB | 2022762 A * | 12/1979 |
| JP | 3153945 | 7/1991 |
| JP | 2004278621 | 10/2004 |

\* cited by examiner

*Primary Examiner*—Bradley T King
*Assistant Examiner*—Anna Momper
(74) *Attorney, Agent, or Firm*—Brown & Michaels, PC

(57) ABSTRACT

A tensioner for imparting tension to a chain having a body, a resilient chain guide element a support member and at least one blade spring. The body contains at least one groove on its surface adjacent to the resilient chain guide for containing a blade spring in compression. The length of the blade spring is less than the length of the support member.

11 Claims, 14 Drawing Sheets

PRIOR ART

LONG MECHANICAL TENSIONER WITH A COMPLIANT BLADE SPRING

REFERENCE TO RELATED APPLICATIONS

This application is related to an application filed simultaneously, entitled "PIVOTING MECHANICAL TENSIONER WITH CROSS STRAND DAMPING". The aforementioned application is hereby incorporated herein by reference. The application is also related to application Ser. No. 10/984,450 filed Nov. 9, 2004, entitled "COMPLIANT SNUBBER" and application Ser. No. 10/692,182 filed Nov. 9, 2004, entitled "COMPLIANT CHAIN GUIDE WITH BLADE SPRING". The aforementioned applications are hereby incorporated by reference.

BACKGROUND OF THE INVENTION

1. Field of the Invention

The invention pertains to the field of chain tensioners. More particularly, the invention pertains to a mechanical tensioner with at least one compliant blade spring.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example during stopping of the engine or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain when the chain is slack, and must be very rigid when the chain tightens.

To accomplish this result, a hydraulic tensioner 1, as shown in prior art FIG. 1, typically comprises a rod or cylinder as a piston 2, which is biased in the direction of the chain by a tensioner spring 3. The piston 2 is housed within a cylindrical housing 5, having an interior space which is open at the end facing the chain and closed at the other end. The interior space of the housing contains a pressure chamber 4 in connection with a reservoir or exterior source of hydraulic fluid pressure. The pressure chamber 4 is typically formed between the housing 5 and the piston 2, and it expands or contracts when the piston 2 moves within the housing 5.

Typically, valves are employed to regulate the flow of fluid into and out of the pressure chamber. For instance, an inlet check valve such as a ball-check valve opens to permit fluid flow in to the pressure chamber 4 when the pressure inside the chamber has decreased as a result of outward movement of the piston 2. When the pressure in the pressure chamber is high, the inlet check valve closes, preventing fluid from exiting the pressure chamber. The closing of the inlet check valve prevents the piston chamber from contracting, which in turn prevents the piston from retracting, achieving a so-called "no-return" function.

Many tensioners also employ a pressure relief mechanism that allows fluid to exit the pressure chamber when the pressure in the chamber is high, thus allowing the piston to retract in response to rapid increases in chain tension. In some tensioners, the pressure relief mechanism is a spring biased check valve. The check valve opens when the pressure exceeds a certain pressure point. Some tensioners may employ a valve which performs both the inlet check function as well as the pressure relief function.

Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

A hydraulic tensioner as used with a tensioner arm or shoe is shown in Simpson et al., U.S. Pat. No. 5,967,921, incorporated herein by reference. Hydraulic chain tensioners typically have a plunger slidably fitted into a chamber and biased outward by a spring to provide tension to the chain. A lever, arm or shoe is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward towards the housing) away from the chain, typically a check valve is provided to restrict the flow of fluid from the chamber. In such a fashion, the tensioner achieves a so-called no return function, i.e., movements of the plunger are easy in one direction (outward away from the housing) but difficult in the reverse direction.

Blade tensioners are tensioners that are commonly used to control a chain or belt where load fluctuations are not so severe as to over flex the spring or springs. A ratchet with backlash is added to tensioners to limit the effective backward or untensioned travel of a tensioning device.

Prior art FIG. 2 shows an example of a blade tensioner. The conventional blade tensioner 110 includes a blade shoe 111 made of resin having a curved chain sliding face and numerous blade springs 121, preferably made of metallic material. The blade springs 121 are arranged in layers on the opposite side of the blade shoe 111 from the chain sliding face, and provide spring force to the blade shoe 111. The ends of each spring-shaped blade spring 121 are inserted in the indented portions 114 and 115, which are formed in the distal portion 112 and proximal portion 113 of the blade shoe 111, respectively.

A bracket 117 is provided for mounting the blade tensioner 110 in an engine. Holes 118 and 119 are formed in the bracket 117, and mounting bolts are inserted into these holes 118 and 119. A sliding face 116 contacts the distal portion of the blade shoe 111 and permits sliding. The slide face 116 is formed on the distal portion of the bracket 117. A pin 120 supports the proximal portion 113 of the blade shoe 111 so that it may move in either direction. The pin 120 is secured on the bracket 117.

FIG. 3 shows a chain tensioning device that has a pair of arms 202, 203 which are joined by a pivot 204. The arms 202, 203 are urged apart so that arm 203 applies tensioning force to a chain (not shown) by means of a spring 206 loaded cam block 205. To prevent collapse of arm 203 during load reversals of the chain, a catch disc 209 and rod 208 are arranged to prevent return movement of the spring loaded cam block 205.

FIG. 4 shows an example of a tensioner that uses a ratchet device. The ratchet tensioner 301 comprises a tensioner housing 307 having a hole 312 for receiving a plunger 308 and a ratchet pawl 317 pivoted by a shaft 316 to the tensioner housing 307 and biased by a ratchet spring 318. The plunger 308 has teeth on one outer side that engage the ratchet pawl 317. The plunger 308 is biased out of the hole 312 to contact the tension lever 310 by fluid in the hollow section 313 and by the plunger spring 314. The tensioner lever 310 pivots on support shaft 309 and has a shoe surface 311 that contacts and applies tension to the slack side of the timing chain 306 wrapped around the camshaft 304 and its sprocket 305 and the crankshaft 302 and its sprocket 303. The plunger's 308 movement in and out of the hole 312 is limited by its teeth and the ratchet pawl 317 that engage them.

FIG. 5 shows a tensioning device of U.S. Pat. No. 6,599, 209. The tensioning device 421 includes a one piece supporting body 422 with interconnecting sections 424 in the shape of an open honeycomb joined to a tensioning track 423. The tensioning track 423 is elastically supported by coil spring 425. Mounting holes 420 are used to fixedly mount the tensioner 421. In alternate embodiments shown in prior art FIGS. 6a and 6b, a pair of tensioning tracks 406 are joined by rib like interconnecting sections 407 to form one piece 402. Interconnecting sections 407 are elastically deformable and have angled sections 408. Between the tensioner tracks 406 and the supporting body (not shown) are either a single leaf spring 409 or a leaf spring packet 409a. One of disadvantages of the tensioning device of U.S. Pat. No. 6,599,209 is the spring only tensions the center of the tensioning track and not along the entire face of the tensioner. Another disadvantage is the assembly required to place the spring within the supporting body, since the tensioner is one piece.

SUMMARY OF THE INVENTION

The present invention consists of a tensioner for imparting tension to a chain consisting of a body, a resilient chain guide element, at least one blade spring, and at least one bracket. The body of the tensioner has a surface with a profile of the path of a new chain. The resilient chain guide element, on the surface of the body has a chain contact surface and two ends wrapped around the ends of the body, with the chain guide being sufficiently larger than the body, such that the chain contact surface can be biased away from the body. The blade spring is present in the groove with each of its ends in the containment means of the groove, urging the chain guide away from the body and toward the chain.

The overall length of the tensioner of the present invention is longer than conventional chain tensioners, in excess of five inches. Within the tensioner, the resilient chain guide element is substantially longer than the length of the blade spring.

DETAILED DESCRIPTION OF THE INVENTION

Figure 1:
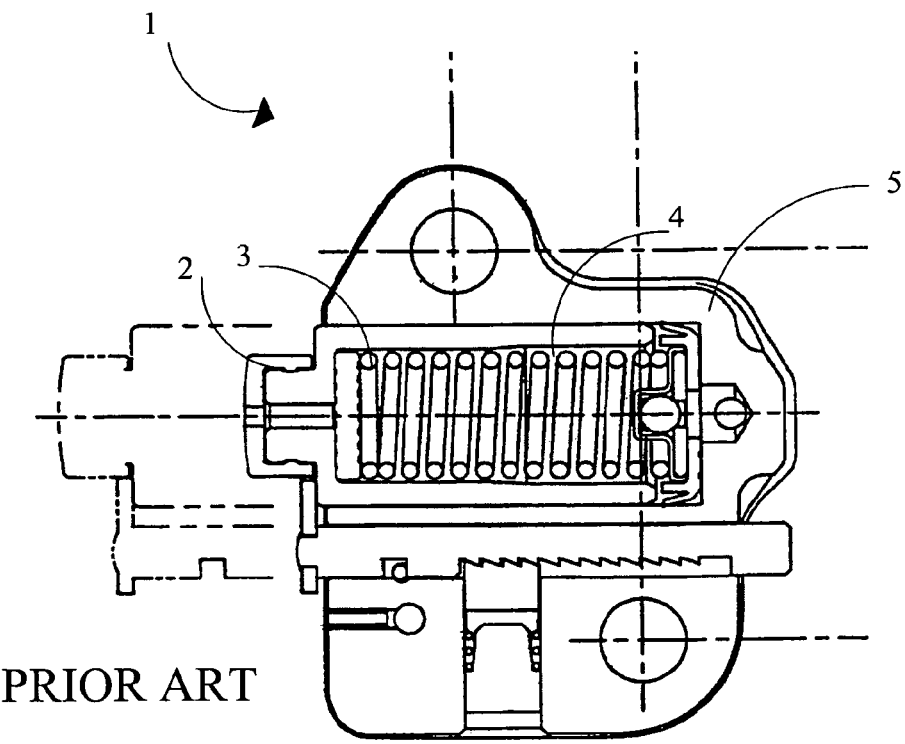
FIG. 1 shows a prior art hydraulic tensioner.
Figure 2:
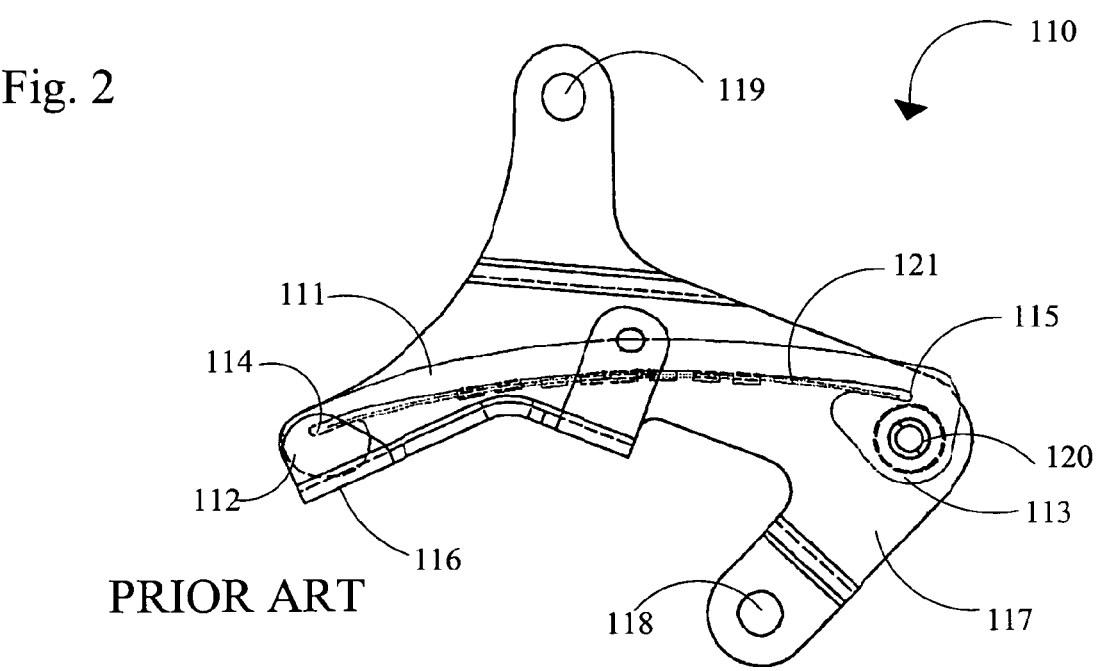
FIG. 2 shows a prior art blade tensioner.
Figure 3:
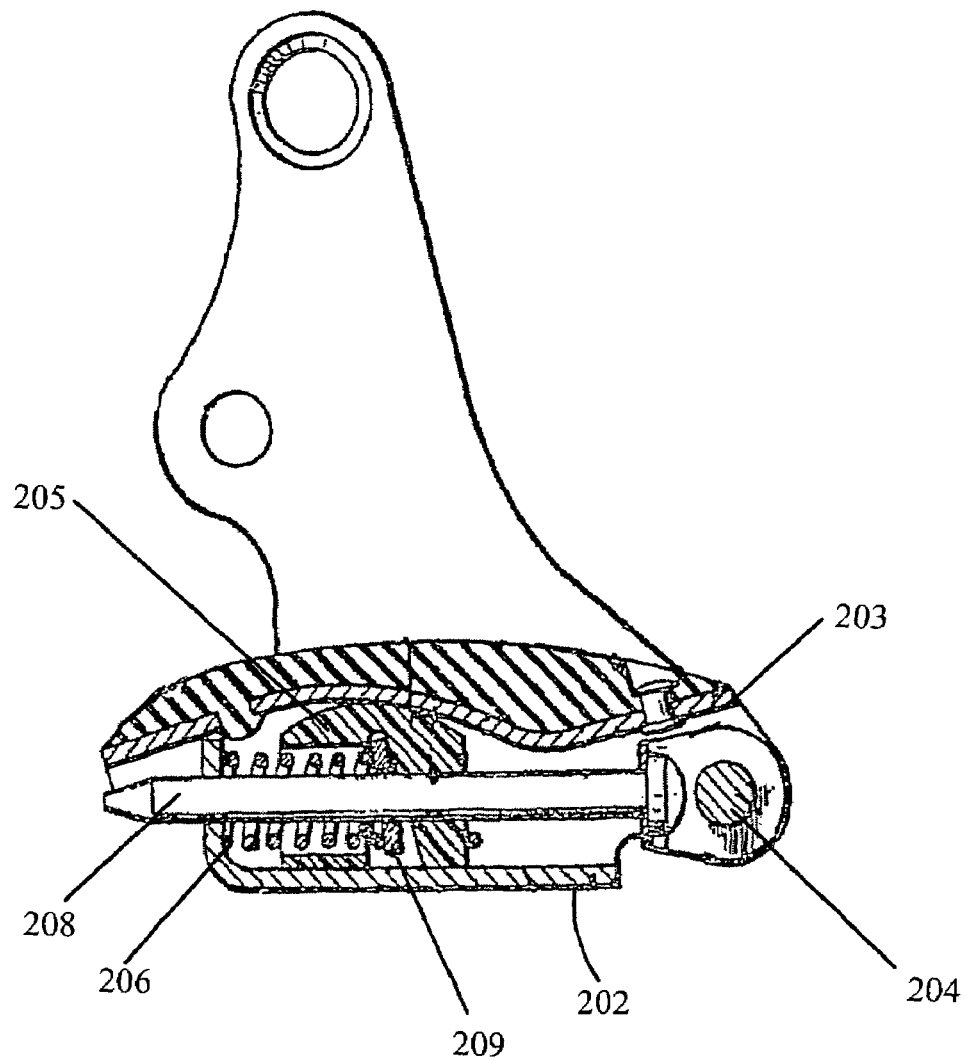
FIG. 3 shows another prior art tensioner.
Figure 4:
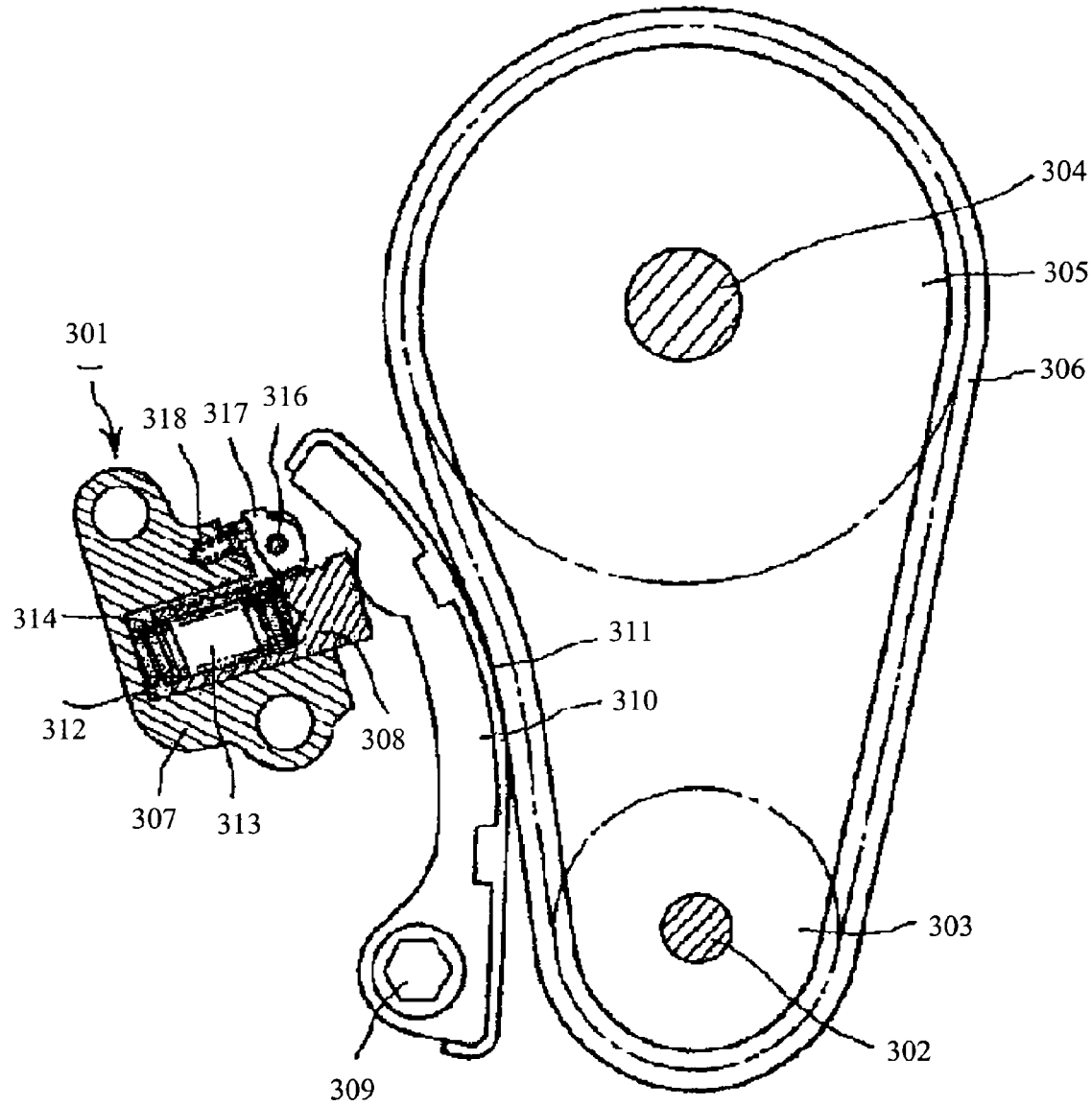
FIG. 4 shows a prior art ratcheting tensioner.
Figure 5:
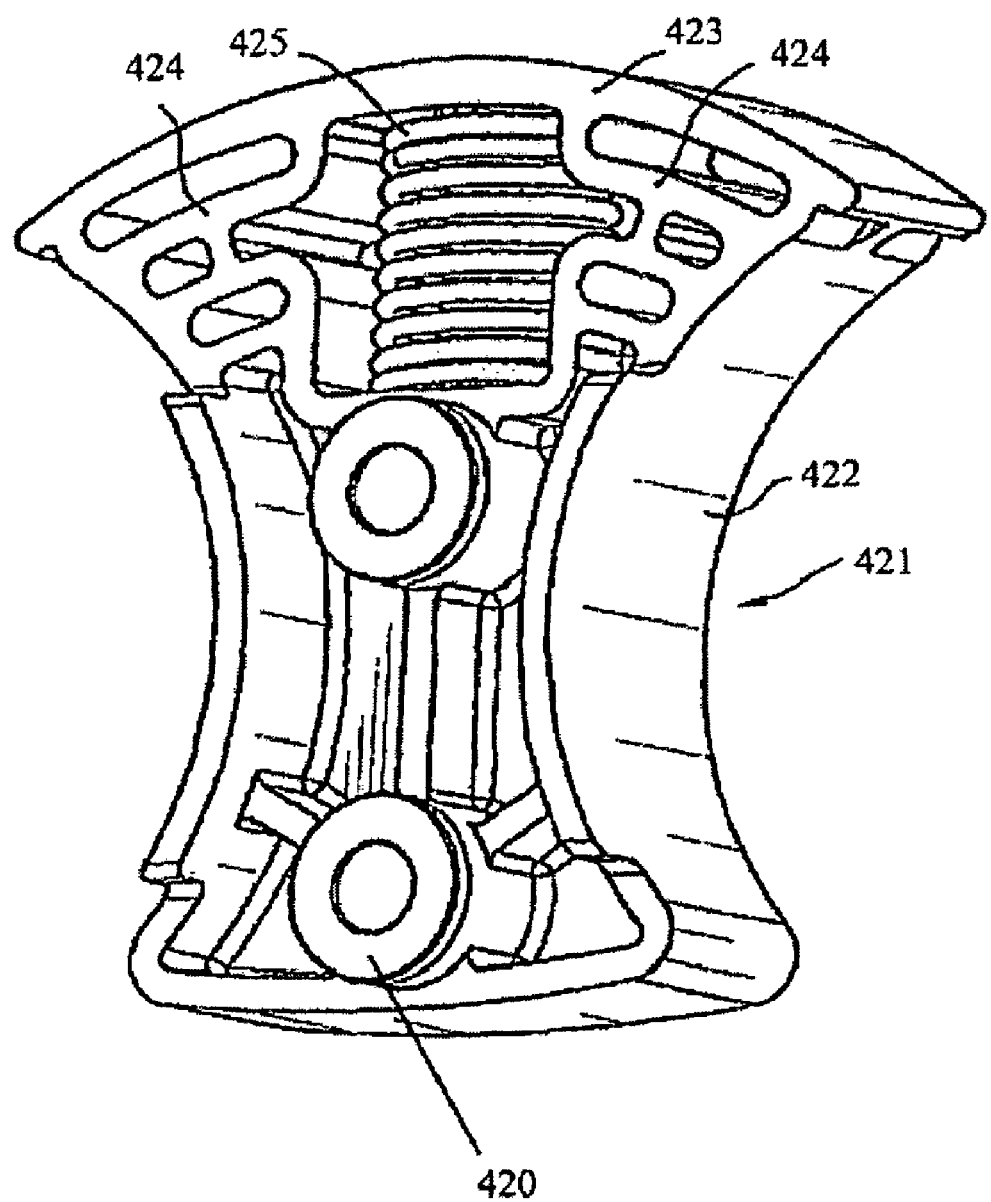
FIG. 5 shows a one piece prior art tensioner.
Figure 6A:
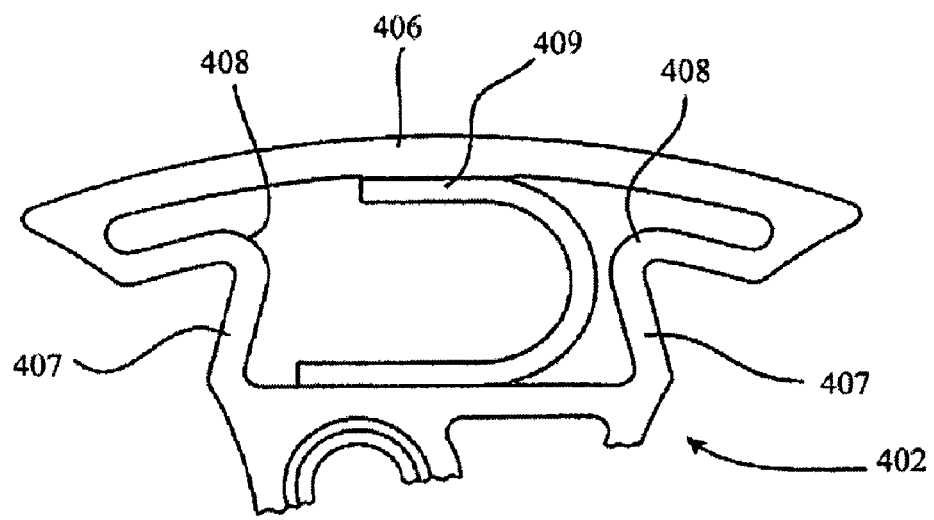
FIG. 6a shows an alternate embodiment of a one piece prior art tensioner.
Figure 6B:
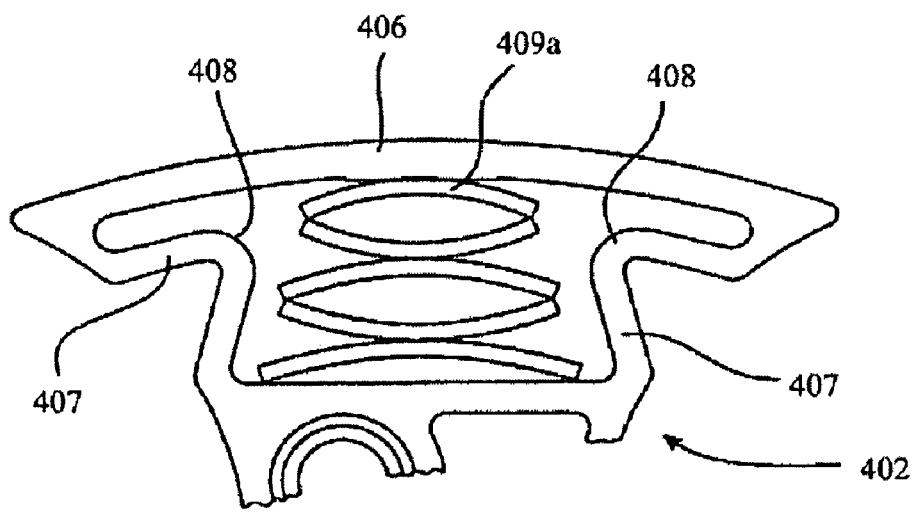
FIG. 6b shows another alternate embodiment of a one piece prior art tensioner
Figure 7:
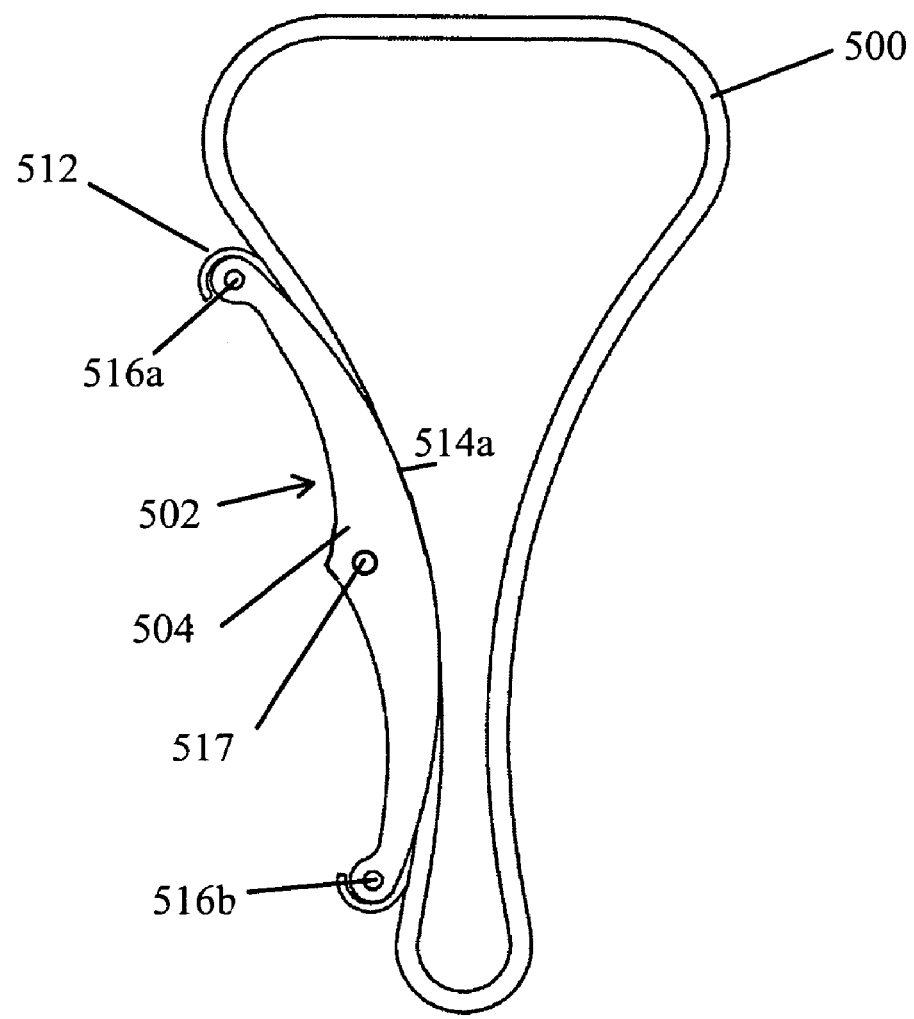
FIG. 7 is a frontal view of the present invention showing a tensioner as it would appear adjacent a new or un-worn chain.
Figure 8:
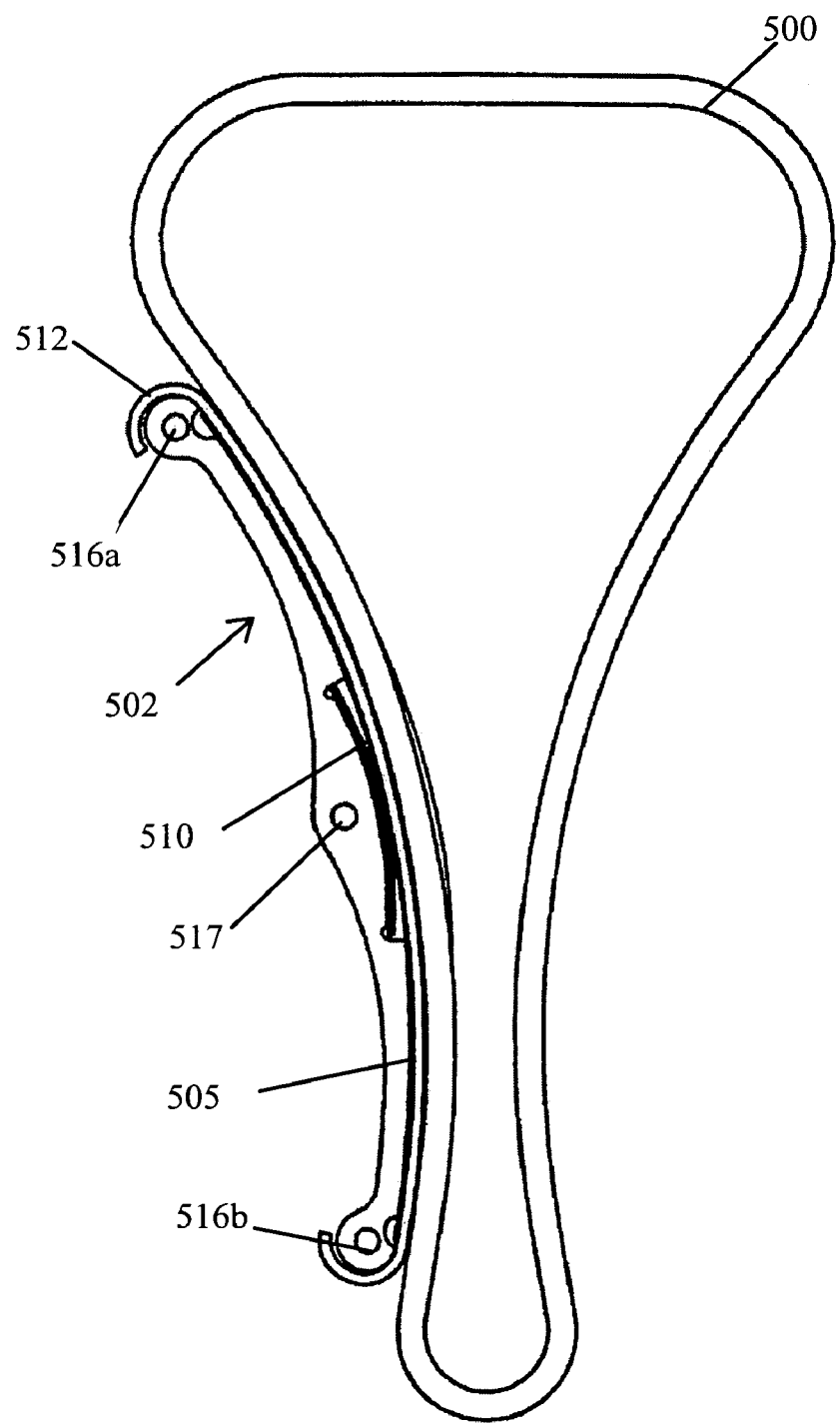
FIG. 8 shows the tensioner of FIG. 7 with one of the chain guide walls cut away.

FIGS. 7 and 8 show a first embodiment of the tensioner of the present invention with a new chain 500 wrapped around a drive sprocket and at least one driven sprocket (not shown). Positioned adjacent to the outside of the slack strand of the chain 500 is tensioner 502. The tensioner 502 may alternatively be located on the tight strand, if desired.

Figure 13:
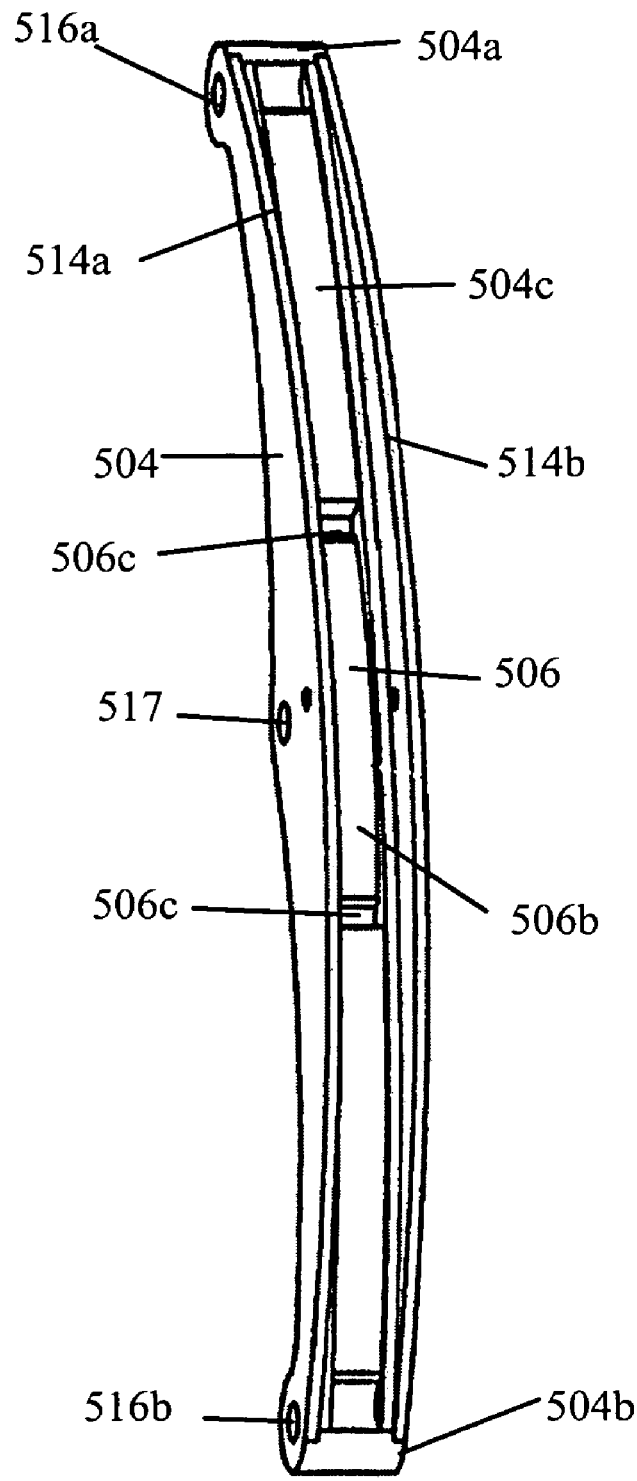
FIG. 13 shows an isometric view of the body of the tensioner.

Referring to FIGS. 7 and 8, a bracket body 504 has a surface 504c with a curved profile that is similar to the path of a new chain. Referring to FIG. 13, a channel cut groove 506 having a bottom 506b and containment means in the form of recessed pockets 506c at either end of the groove 506 is located longitudinally along a portion of the length of the surface 504c. FIG. 13 shows an embodiment where the groove is located substantially equidistant from the first and second ends, 504a and 504b, respectively, of bracket body 504. At least one blade spring 510, as shown in FIG. 8, is placed in the channel cut groove 506. However, the groove may be located at any point along surface 504c, as dictated by design and functional parameters.

The blade spring 510 is an elongated rectangle curled lengthwise in its free state and applied substantially uncurled in its assembled state, into the channel cut groove 506, between the bracket body 504 and support member 505. Support member 505 is an elongated rectangle consisting of a metallic material that is manufactured to provide spring tension. The primary force urging the resilient chain guide element 512 toward the chain 500 is provided by the blade spring 510. The spring tension force exhibited by the support member 505 need only be sufficient to transfer the force of the blade spring 510 so that this force is distributed substantially evenly along the entire length of the resilient chain guide element 512.

Recessed pockets 506c at either end of the groove 506 act as containment means and bearing surfaces for the ends of the blade spring 510 as the blade spring tries to curl into its free state. The blade spring 510 exerts a force to the underside support member 505 as the blade spring 510 tries to curl into its free state. The inherent nature of the blade spring 510 to return to its resting curled state forces the resilient chain guide element 512 to be in constant contact with and applying a sufficient force to the chain 500 to maintain a substantially constant tension on the chain 500. The surface 504c of the bracket body 504 acts as a stop for the support member 505 in opposition to excessive force from the chain 500 in the direction of the chain tensioner 502. Chain guide walls 514a and 514b are present on either side of the surface 504c of the bracket body 504 to aid in maintaining the support member 505 and the resilient chain guide element 512 in the "Z" direction when in its extended state, such as when it is in contact with a worn or slack chain. The chain guide walls 514a and 514b are preferably fixedly attached to the bracket body or alternatively, and preferably, integral to the bracket body 504. Holes 516a and 516b are located at opposite ends of the bracket body 504 to receive bolts, rivets or other means (not shown) for rigidly securing the bracket body 504 to the engine block or other appropriate mounting surface.

The bracket body 504 may also be securely mounted to the engine at a single point, such as at pivot hole 517. In this embodiment, bracket body 504 would be allowed to pivot around the centerline of pivot hole 517.

Figure 10:
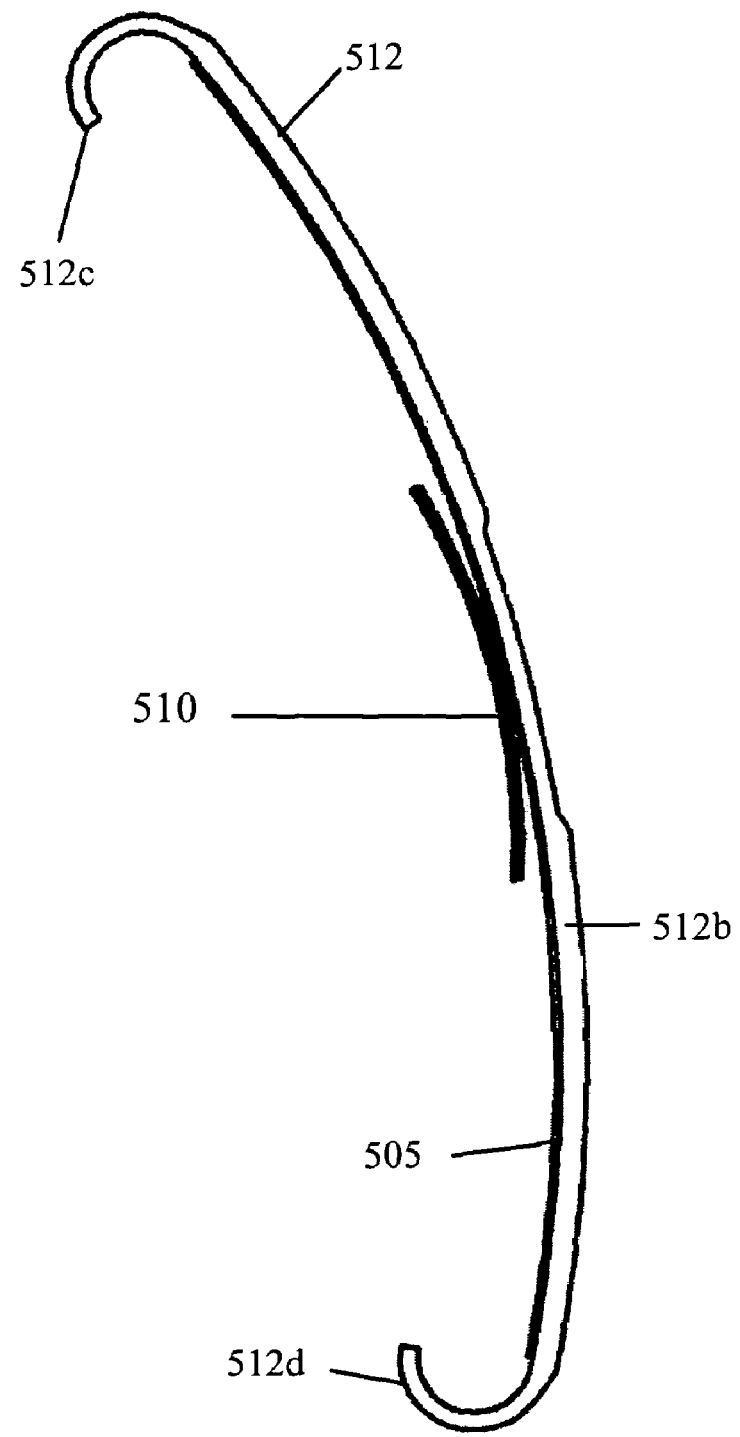
FIG. 10 shows the chain guide element, the support member and a blade spring.
Figure 12:
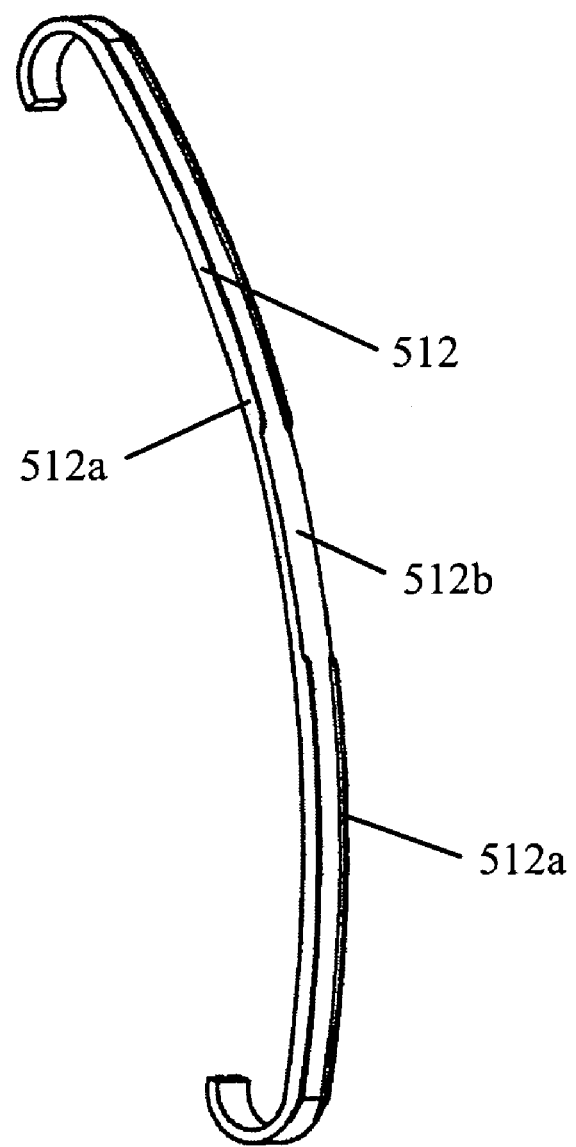
FIG. 12 shows an isometric view of the resilient chain guide element.

The resilient chain guide element 512, as shown in FIG. 10, has a first end 512c and second end 512d joined together by a middle portion that acts as the chain sliding face 512b. The chain sliding face 512b is in slideable contact with the chain 500. Along the chain sliding face 512b of the resilient chain guide element 512 are guide ridges 512a on either side of the chain sliding face 512b to aid in guiding the chain 500 as shown in FIG. 12. The first end 512c and the second end 512d of the resilient chain guide element 512 are curved underneath and towards the center of the resilient chain guide element 512. The chain guide element 512 is larger than the bracket body 504 and the curved first end 512c and second end 512d of the resilient chain guide element 512 receive the respective first end 504a and second end 504b of the bracket body 504, loosely securing the resilient chain guide element 512 to the bracket body 504. The resilient chain guide element 512 is preferably made of a material that is semi-flexible at engine operating temperatures, allowing the resilient chain guide element 512 to conform to the chain 500 in response to the urging force of the blade spring 510 that is transmitted through support member 505.

As shown in FIGS. 7 and 8, the tensioner 502 is placed relative to the slack strand of a new chain, so that the strand is received between the pair of chain guide walls 514a, 514b and slides on the chain sliding face 512b of the resilient chain guide element 512. Since the resilient chain guide element 512 of the tensioner 502 is semi-flexible at engine operating temperatures, the force exerted by the blade spring 510 biases the support member 505 and the resilient chain guide element 512 away from the bracket body 504 such that the chain sliding face 512b conforms to and maintains constant contact with the strand of chain 500.

The load capacity of the blade spring 510 when securely positioned within the groove 506 upon the application of a flattening load, is represented by the following formula:

$$P = 4EFbt^3/L^3$$

P=Load E=Modulus of Elasticity F=Deflection
b=width L=Length between distance between recessed pockets 506c
t=thickness As the length of a spring increases, the load carrying capacity of the spring decreases by the cube of its length. A shorter spring is therefore capable of maintaining a more constant force than would a longer blade spring found in conventional chain tensioners.

According to the present invention, the length of the blade spring 510 is significantly shorter than the length of the support member 505. Specifically, the ratio of the length of the blade spring 510 to the support member 505 is from about 1:2 to about 1:6. Preferably, the ratio is from about 1:3 to about 1:4.

Figure 9:
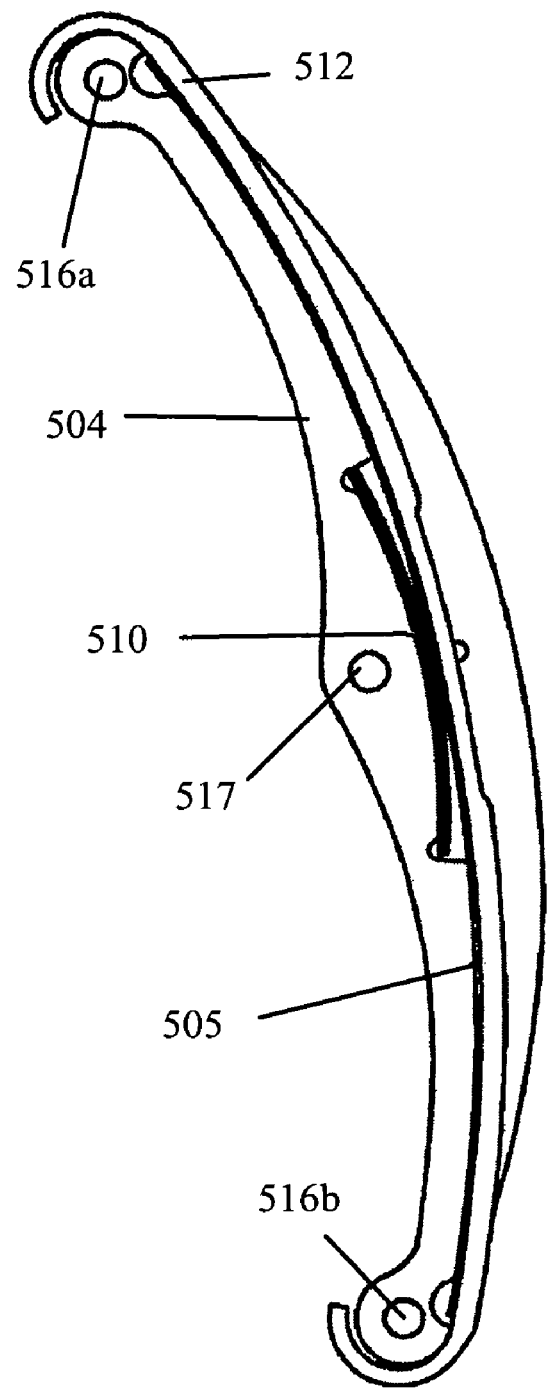
FIG. 9 shows a cut-away of the tensioner of FIG. 8 without the chain.

FIG. 9 shows the compliant tensioning device 502 section cut and positioned to contact a tight strand of the chain (not shown). FIG. 10 shows the resilient chain guide element 512 and the support member 505 with the blade spring 510 substantially in compression as it would appear when subjected to the force exerted by a tight chain strand.

Figure 11:
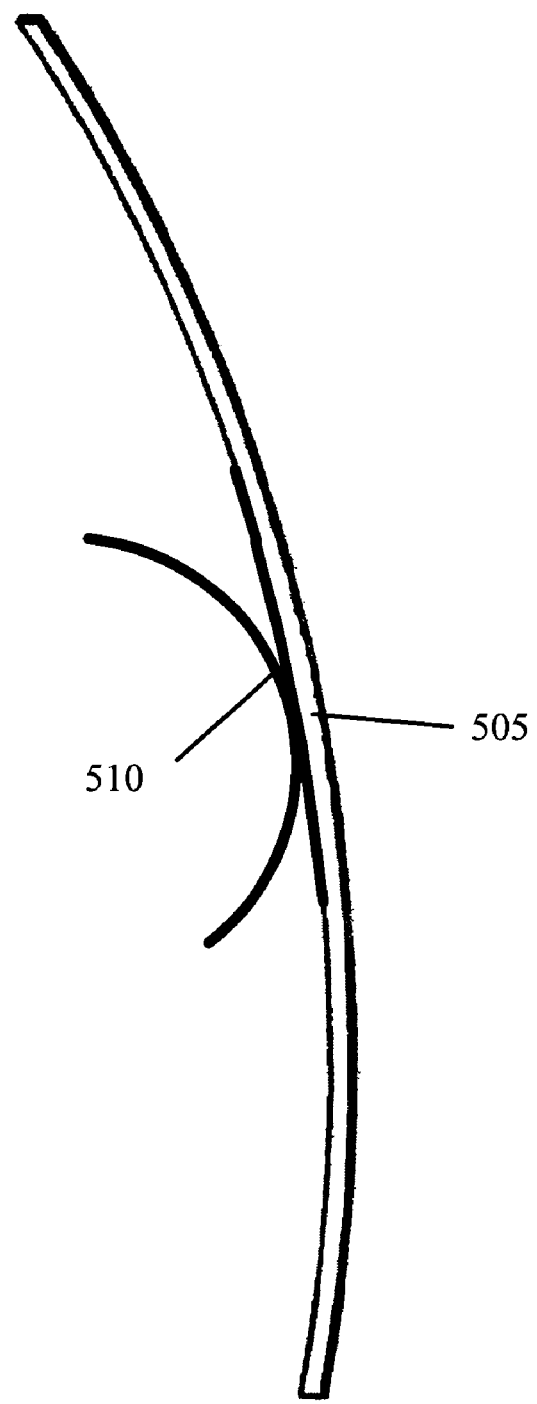
FIG. 11 shows the support member and the blade spring bowed in response to a slack or worn chain.

FIG. 11 shows the section cut resilient chain guide element 512 and the support member 505 with the blade spring 510 in its free state. The blade spring 510 will respond to a worn or slack chain by curving or bowing more than a blade spring 510 adjacent a new or tight chain. As the chain wears and elongates, the blade spring becomes more bowed to forcibly urge support member 505 and the resilient chain guide element 512 to exert a force on the chain sufficient to remove slack in the strand.

Blade spring 510 consists of conventional spring material in a generally elongated rectangular shape that is curled lengthwise in its free state. As it is installed in the groove 506 of bracket body 504, it is compressed between the support member 505 and the bracket body 504, thus exerting a force on the resilient chain guide element 512 that urges it into forceable contact with the chain 500. Due to the relatively short length of the blade spring 510, it is able to exert a substantially constant force on support member 505 as the resilient chain guide element 512 travels the distance between the points of contact with the strand of chain 500 that alternates between slack and tight chain conditions.

Groove 506 may be as wide as the width of surface 504c between chain guide walls 514a and 514b. In the alternative, the width of groove 506 may be less than the width of surface 504c if it is deemed necessary to provide a continuity of support for support member 505 along the entire length of surface 504c.

Figure 14:
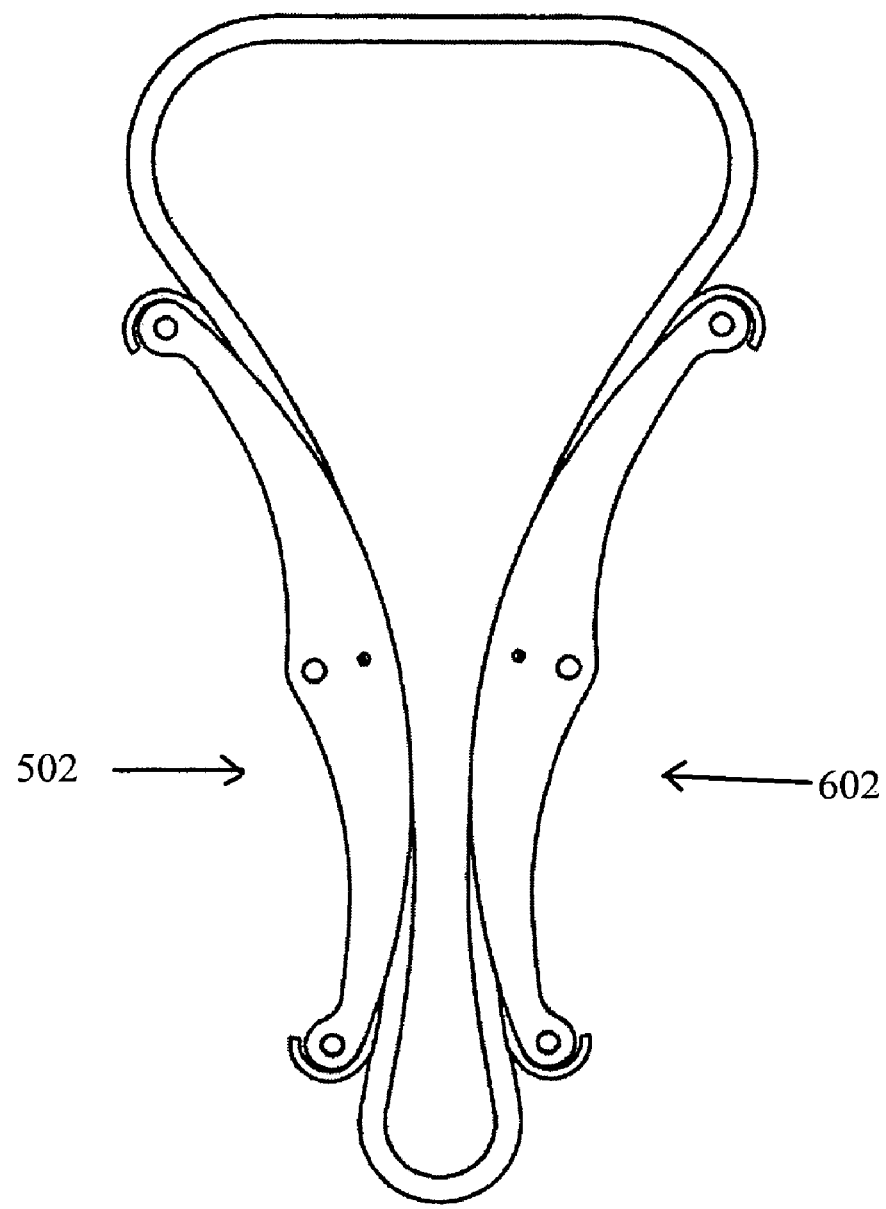
FIG. 14 shows a frontal view of a second embodiment of the invention consisting of two tensioners.

FIG. 14 shows a second embodiment of the present invention. In this embodiment, a first tensioner 502 is located on the slack strand and a second tensioner 602 is located on the tight strand of the chain 500. The first tensioner and the second tensioner can be exactly the same and have the same corresponding elements as described hereinabove with respect to the first embodiment. Alternatively, it may be desirable to insert springs having different load characteristics. In this case, the blade spring in the first tensioner on one strand may exert a stronger force than the blade spring in the second tensioner. In the event of a load reversal due to torsionals or the reverse rotation that can occur an internal combustion engine is stopped, the slack and tight strands are reversed and the tensioner on the tight strand would respond by removing the slack and preventing the bunching of the chain at the driven sprocket that contributes to tooth jumping when normal chain rotation is resumed. The possibly weaker spring on the tight strand would also soften the impact when the chain again resumes its normal tight path and resilient chain guide element 512 reseats on bracket body 504.

Figure 15:
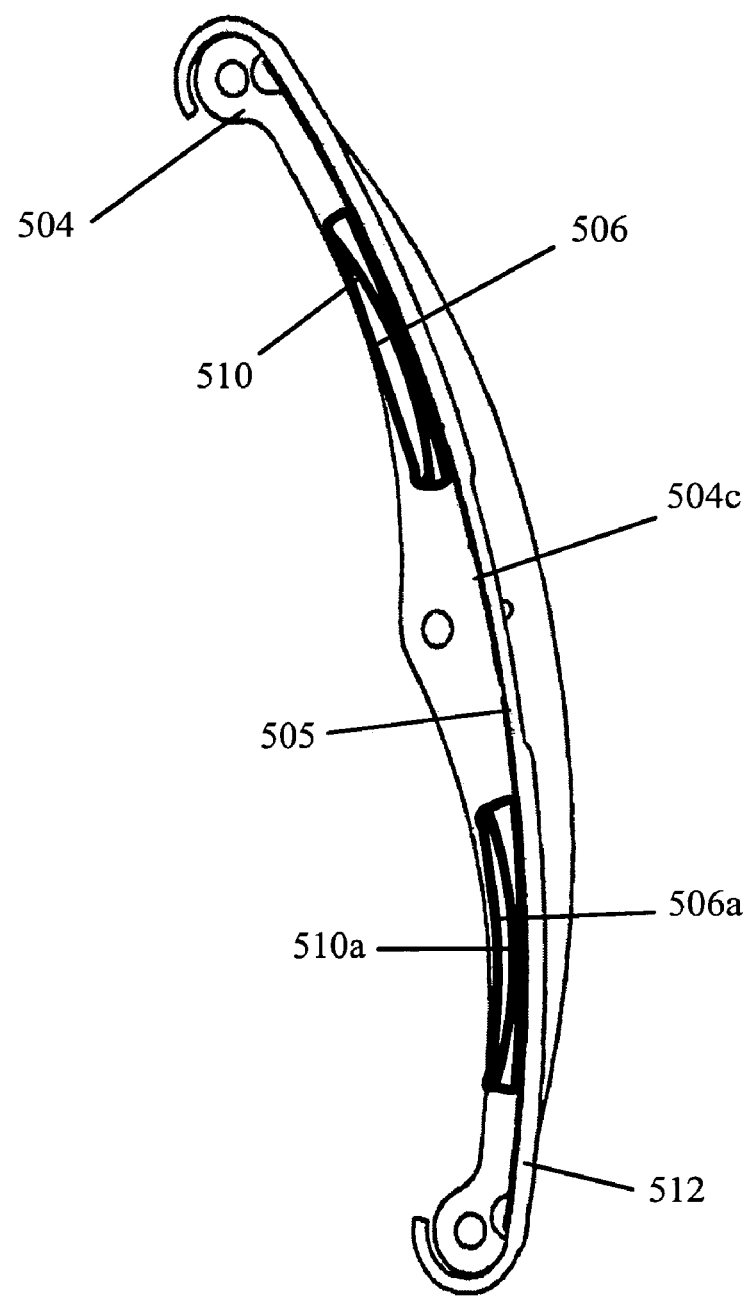
FIG. 15 shows an alternate embodiment of the invention in which a single tensioner contains two blade springs.

FIG. 15 shows an alternate embodiment of the invention. In this case, two blade springs 510 and 510a, as described hereinabove, are positioned in series along surface 504c of a single bracket body 504 within separate channel cut grooves 506 and 506a. Instead of applying a single force at the approximate mid point of the support member 505, each of the two blade springs 506 and 506a apply their respective forces at two different locations along the length of resilient chain guide element 512. The blade springs may be designed to approximately divide the length of the bracket body 504 into thirds or they may be placed in an asymmetrical arrangement along the length, as desired. In the latter instance, for example, one blade spring may be located at approximately the mid point of the length with the second blade spring located at a point approximately equidistant from the mid point of the bracket body and one of its ends. In this last example, it is also possible to install a third blade spring that would be located approximately equidistant from the mid point of the bracket body and its other end. These alternate embodiments may be necessitated by the dynamics of the movement of the chain 500 with respect to variations in design parameters, for example, having to do with possible limitations in finding suitable mounting locations for the bracket body 504.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for imparting tension to a chain comprising:
   a body having a first end and a second end with a surface facing the chain, a pivot hole located approximately equidistant between the first and second ends and at least one groove located longitudinally along a portion of a length of the surface, the groove having containment means at each end;
   a support member located on the surface of the body;
   a resilient chain guide element covering the support member, having a chain contact surface with a first end wrapped around the first end of the body and with a second end wrapped around the second end of the body, the resilient chain guide element being longer than a length of the surface of the body, such that the chain contact surface is movable in a the direction of the chain without disengaging from the body; and
   at least one blade spring having a length shorter than a length of the support member said at least one blade spring tending to curl in a free state to contact a portion of the support member and positioned in the at least one groove of the body, each end of said blade spring securely located within one of the containment means of the groove, the containment means consisting of recessed pockets in the body to permit the at least one blade spring to curl toward its free state and return to contact with the surface of the body,
   wherein a ratio of a length the lengths of the at least one blade spring to the support member is from about 1:2 to about 1:6.

2. The tensioner of claim 1, wherein the ratio of the lengths of the at least one blade spring to the support member is from about 1:3 to about 1:4.

3. The tensioner of claim 1 wherein the groove is located approximately equidistant between the first end and the second end of the body.

4. The tensioner of claim 1 further comprising a second groove positioned along the length of the surface of the body, each of the grooves being located at approximately one third the length of body from each end of the body.

5. The tensioning system of claim 1 further comprising two holes located on the body to securely affix the body to the engine block.

6. A tensioning system for imparting tension to a chain having a slack strand and a tight strand comprising a first tensioner located on the slack strand wherein the first tensioner comprises:
   a first body having a first end and a second end with a surface facing the chain, a pivot hole located approximately equidistant between the first and second ends and at least one groove located longitudinally along a portion of a length of the surface, the groove having a containment means at each end;
   a support member located on the surface of the body;
   a resilient chain guide element covering the support member, having a chain contact surface having a first end wrapped around the first end of the body and a second end wrapped around the second end of the body, the resilient chain guide element being longer than a length of the surface of the body, such that the chain contact surface is movable in a direction of the chain without disengaging from the body; and
   at least one blade spring having a length shorter than a length of the support member said at least one blade spring tending to curl in a free state to contact a portion of the support member and being located in the at least one groove of the body, each end of said blade spring securely positioned within one of the containment means of the groove, the containment means consisting of recessed pockets in the body to permit the at least one blade spring to curl toward its free state and return to contact with the surface of the body;
   wherein a ratio of a the length of the at least one blade spring to the support member is from about 1:2 to about 1:6; and
   a second tensioner located on the tight strand of the chain comprising:
   a second body having a first end and a second end with a surface facing the chain, a pivot hole located approximated equidistant between the first and second ends and at least one groove located longitudinally along a portion of a length of the surface, the groove having a containment means at each end;
   a support member located on the surface of the body;
   a resilient chain guide element covering the support member, having a chain contact surface having a first end wrapped around the first end of the body and a second end wrapped around the second end of the body, the resilient chain guide element being longer than a length of the surface of the body, such that the chain contact surface is movable in a the direction of the chain without disengaging from the body; and
   at least one blade spring having a length shorter than the length of the support member said at least one blade spring tending to curl in a free state to contact a portion of the support member being located in the at least one groove of the body, each end of said blade spring securely positioned within one of the containment means of the groove, the containment means consisting of recessed pockets to permit the at least one blade spring to curl toward its free state and return to contact with the surface of the body;
   wherein a ratio of a length of at least one blade spring to the support member is from about 1:2 to about 1:6.

7. The tensioning system of claim 6, wherein the ratio of the length of the at least one blade spring to support member is from about 1:3 to about 1:4.

8. The tensioning system of claim 6 wherein a single groove is located approximately equidistant between the first end and the second end of the first body and a single groove is located approximately equidistant between the first end and the second end of the second body.

9. The tensioning system of claim 6 further comprising a second groove positioned along the length of the surface of the first body.

10. The tensioning system of claim 9 further comprising a second groove positioned along the length of the surface of the second body, each of the grooves being located approximately one third along the longitudinal length of the second body.

11. The tensioning system of claim 6 further comprising two holes located on the first body to securely affix the first body to the engine block and two holes located on the second body to securely affix the second body to the engine block.

* * * * *

UNITED STATES PATENT AND TRADEMARK OFFICE
CERTIFICATE OF CORRECTION

PATENT NO. : 7,597,640 B2  Page 1 of 1
APPLICATION NO. : 11/204306
DATED : October 6, 2009
INVENTOR(S) : Markley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this

Twenty-eighth Day of September, 2010

David J. Kappos
*Director of the United States Patent and Trademark Office*